(12) United States Patent
Xia et al.

(10) Patent No.: US 12,436,319 B2
(45) Date of Patent: Oct. 7, 2025

(54) MOTOR FOR DRIVING LIQUID STATE CAMERA LENS, CAMERA LENS ASSEMBLY, AND TERMINAL DEVICE

(71) Applicant: HONOR DEVICE CO., LTD., Shenzhen (CN)

(72) Inventors: Taihong Xia, Shenzhen (CN); Shuai Yuan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 14 days.

(21) Appl. No.: 18/245,513

(22) PCT Filed: Jan. 29, 2022

(86) PCT No.: PCT/CN2022/074960
§ 371 (c)(1),
(2) Date: Mar. 15, 2023

(87) PCT Pub. No.: WO2023/273341
PCT Pub. Date: Jan. 5, 2023

(65) Prior Publication Data
US 2024/0118459 A1    Apr. 11, 2024

(30) Foreign Application Priority Data

Jun. 30, 2021   (CN) .......................... 202110735087.7

(51) Int. Cl.
*G02B 3/12*          (2006.01)
(52) U.S. Cl.
CPC ..................................... *G02B 3/12* (2013.01)

(58) Field of Classification Search
CPC .......... G02B 3/12; G02B 7/08; G02B 26/004; G02B 27/646; G02B 3/14; H02K 41/0356; H02K 5/00
See application file for complete search history.

(56) References Cited

U.S. PATENT DOCUMENTS

| 9,319,574 B2 | 4/2016 | Shin et al. |
| 10,054,759 B2 | 8/2018 | Kang et al. |

(Continued)

FOREIGN PATENT DOCUMENTS

| CN | 1687812 A | 10/2005 |
| CN | 203965705 U | 11/2014 |

(Continued)

*Primary Examiner* — James C. Jones
(74) *Attorney, Agent, or Firm* — Fish & Richardson P.C.

(57) ABSTRACT

Disclosed are a motor for driving a liquid state camera lens. Includes at least one sub-motor, the sub-motor is independently controllable, and includes: a fixed member part; a movable member part movable relative to the fixed member part in an optical axis direction of the liquid state camera lens, where the fixed member part includes a fixed guide member, the movable member part includes a movable guide member, a connecting arm, and a plurality of guide balls, and the plurality of guide balls are arranged between the fixed guide member and the movable guide member; the connecting arm is arranged at an end of the movable guide member facing the liquid state camera lens; the movable guide member drives the rigid connecting arm to squeeze the liquid state camera lens when subjected to a force in the optical axis direction; and a driving circuit part.

17 Claims, 9 Drawing Sheets

(56) References Cited

U.S. PATENT DOCUMENTS

| | | | |
|---|---|---|---|
| 2006/0132640 A1 | 6/2006 | Tirole et al. | |
| 2007/0280667 A1 | 12/2007 | Shin | |
| 2015/0029605 A1 | 1/2015 | Zhu | |
| 2021/0208417 A1* | 7/2021 | Choi | H04N 23/687 |
| 2022/0187615 A1 | 6/2022 | Xia et al. | |
| 2022/0390813 A1 | 12/2022 | Lee et al. | |

FOREIGN PATENT DOCUMENTS

| | | | |
|---|---|---|---|
| CN | 106161887 A | 11/2016 |
| CN | 106772909 A | 5/2017 |
| CN | 109581648 A | 4/2019 |
| CN | 109975973 A | 7/2019 |
| CN | 110297377 A | 10/2019 |
| CN | 110794547 A | 2/2020 |
| CN | 212115444 U | 12/2020 |
| CN | 113589410 A | 11/2021 |
| WO | 2020173393 A1 | 9/2020 |

* cited by examiner

MOTOR FOR DRIVING LIQUID STATE CAMERA LENS, CAMERA LENS ASSEMBLY, AND TERMINAL DEVICE

CROSS-REFERENCE TO RELATED APPLICATIONS

This application is a national stage of International Application No. PCT/CN2022/074960, filed on Jan. 29, 2022, which claims priority to Chinese Patent Application No. 202110735087.7, filed on Jun. 30, 2021. The disclosures of the aforementioned applications are hereby incorporated by reference in their entireties.

TECHNICAL FIELD

This application relates to the field of lens driving, and in particular, to a motor for driving a liquid state camera lens, a camera lens assembly, and a terminal device.

BACKGROUND

A liquid state camera lens (liquid state camera Lens) is a micro camera. Using FIG. 1 as an example, a lens assembly of a liquid state camera lens includes a container 01, a sealing film 02 attached on the container 01, and a liquid 03 accommodated between the container 01 and the sealing film 02. Auto focus (auto focus, AF) and optical image stabilization (optical image stabilization, OIS) are necessary steps to improve shooting quality of the liquid state camera lens. Specifically, the auto focus requires that the liquid state camera lens can calculate an object distance from a subject by obtaining light reflected by the subject, and adjust a focal length along an optical axis direction according to the calculated object distance to implement clear imaging. The optical image stabilization requires that the liquid state camera lens can move a focus deviated by jitter under an external force to an imaging point, so as to implement the clear imaging.

To ensure working performance of the auto focus and the optical image stabilization of the liquid state camera lens, a motor needs to be assembled in the liquid state camera lens. The motor uniformly changes the shape of the sealing film 02 in the optical axis direction, and the sealing film 02 squeezes the liquid 03 to change the shape of a refraction plane of a lens assembly, thereby changing a refraction direction of the light, to adjust the focal length to implement the auto focus. The motor non-uniformly changes the shape of the sealing film 02 in the optical axis direction, and the sealing film 02 squeezes the liquid 03 to change the shape of the refraction plane of the lens assembly, thereby changing the refraction direction of the light, to move the deviated focus to the imaging point.

The motor includes a movable member and a guide elastic piece. The guide elastic piece is of a sheet structure, with two ends fixed and a middle part connected to the movable member. In an actual guiding process, the guide elastic piece may deform in the optical axis direction. Therefore, when subjected to a driving force, the movable member may move in the optical axis direction under the guidance of the guide elastic piece, so as to squeeze the liquid state camera lens. However, the deformation of the guide elastic piece may produce a counter force opposite to a moving direction of the movable member, and the counter force counteracts a part of a driving force, resulting in an insufficient driving force, which further affects accuracy of the auto focus and the optical image stabilization of the liquid state camera lens.

SUMMARY

This application provides a motor for driving a liquid state camera lens, and a camera lens assembly, to ensure the driving force of the motor to the liquid state camera lens.

According to a first aspect, an embodiment of this application provides a motor for driving a liquid state camera lens. The motor includes at least one sub-motor, the sub-motor is independently controllable, and the sub-motor includes:

a fixed member part;

a movable member part movable relative to the fixed member part in an optical axis direction of the liquid state camera lens, wherein the fixed member part comprises a fixed guide member, the movable member part comprises a movable guide member, a connecting arm, and a plurality of guide balls, the fixed guide member and the movable guide member are arranged opposite to each other, and the plurality of guide balls are arranged between the fixed guide member and the movable guide member; the connecting arm is arranged at an end of the movable guide member facing the liquid state camera lens; and the movable guide member drives the connecting arm to squeeze the liquid state camera lens when subjected to a force in the optical axis direction; and a driving circuit part, configured to control displacement of the movable member part in the optical axis direction.

The driving circuit part enables the movable member part to move relative to the fixed member part in the optical axis direction of the liquid state camera lens and squeeze the liquid state camera lens to complete auto focus and optical image stabilization of the liquid state camera lens. Under driving of the driving circuit part, the movable guide member is subjected to a driving force to start moving in a guiding direction of a guide member, and the connecting arm arranged on the movable guide member can move with the movable guide member. The guide balls arranged between the fixed guide member and the movable guide member are configured to reduce a friction force during movement of the movable guide member, so that the movable guide member can move more smoothly, and the driving force is fully applied to squeeze the liquid state camera lens.

Optionally, with reference to the first aspect, in a possible implementation, the fixed member part further comprises a motor base on which the fixed guide member is fixed, a circuit board arranged at a periphery of the fixed guide member, and a coil fixed at a side of the fixed guide member facing an optical axis; and the movable member part further comprises a magnet arranged opposite to the coil, and the magnet is fixed on the movable guide member.

The circuit board is configured for wiring and the coil can be energized through the circuit board. The coil can generate a magnetic field when energized, and the magnet can move relative to the coil under an action of the magnetic field. Because the magnet is fixed on the movable guide member, when the magnet moves, the movable guide member can be driven to move in the optical axis direction of the liquid state camera lens.

Optionally, with reference to the first aspect, in a possible implementation, the fixed member part further comprises a magnetic conductive sheet, the magnetic conductive sheet is fixed at a side of the fixed guide member away from the coil, and the magnetic conductive sheet, the coil, and the magnet form a closed magnetic circuit.

The magnet and the coil produce magnetic leakage when energized, resulting in an energy loss. The magnetic conductive sheet, the coil, and the magnet form the closed magnetic circuit, which can avoid the magnetic leakage. The magnetic conductive sheet may be made of metal iron, and an attraction force between the magnetic conductive sheet and the magnet ensures that the movable guide member can always press the guide balls on the fixed guide member tightly, thereby ensuring that the guide balls can stably move between the fixed guide member and the movable guide member.

Optionally, with reference to the first aspect, in a possible implementation, the fixed member part further comprises a motor base on which the fixed guide member is fixed, and a magnet fixed at a side of the fixed guide member facing an optical axis; and the movable member part further comprises a coil arranged opposite to the magnet and fixed on the movable guide member, and a circuit board arranged at a periphery of the coil.

The coil can generate a magnetic field when energized, and the energized coil can interact with the magnet to move relative to the magnet. Because the coil and the circuit board are fixed on the movable guide member, when the coil moves, the circuit board and the movable guide member can be driven to move in the optical axis direction of the liquid state camera lens.

Optionally, with reference to the first aspect, in a possible implementation, the movable member part further comprises a magnetic conductive sheet, the magnetic conductive sheet is fixed at a side of the coil away from the magnet, and the magnetic conductive sheet, the coil, and the magnet form a closed magnetic circuit.

The magnetic conductive sheet, the coil, and the magnet form the closed magnetic circuit, which can reduce magnetic leakage. An attraction force between the magnetic conductive sheet and the coil ensures that the movable guide member can always press the guide ball on the fixed guide member tightly, thereby ensuring that the guide ball can stably move between the fixed guide member and the movable guide member.

Optionally, with reference to the first aspect, in a possible implementation, a plurality of sub-motors are arranged, and motor bases of the plurality of sub-motors form an integral motor base. It is more convenient to manufacture the integral motor base.

Optionally, with reference to the first aspect, in a possible implementation, the fixed member part comprises at least two fixed guide members, the movable member part comprises at least two movable guide members, the fixed guide member is provided with a first guide rail groove, the movable guide member is provided with a second guide rail groove, the first guide rail groove and the second guide rail groove are arranged opposite to each other, and the guide balls are arranged between the first guide rail groove and the second guide rail groove.

In this way, the guide balls are arranged in the guide rail grooves, so that the guide balls can move more smoothly.

Optionally, with reference to the first aspect, in a possible implementation, the first guide rail groove is a V-shaped groove or a rectangular groove; and the second guide rail groove is a V-shaped groove or a rectangular groove.

Optionally, with reference to the first aspect, in a possible implementation, at least one first guide rail groove is a rectangular groove; or at least one second guide rail groove is a rectangular groove.

By combining the V-shaped groove with the rectangular groove, the guide balls can move more smoothly, avoiding a situation in which the guide balls are jammed during guiding.

Optionally, with reference to the first aspect, in a possible implementation, the connecting arm is rigid.

The connecting arm made of a rigid material has a very small deformation amount compared with a movement amount during a movement under a force. In other words, when subjected to a driving force in the optical axis direction, the connecting arm can better transfer displacement of the movable guide member to the liquid state camera lens, to squeeze the liquid state camera lens, ensuring accuracy of auto focus and optical image stabilization.

Optionally, with reference to the first aspect, in a possible implementation, the sub-motor further comprises a squeezing component, the squeezing component comprises an arc-shaped squeezing portion, and a lug arranged on an outer arc of the squeezing portion, and the lug is connected to an end of the connecting arm away from the movable guide member; and the squeezing component directly faces the liquid state camera lens and is in contact with the liquid state camera lens. The liquid state camera lens is squeezed by the squeezing portion, and the liquid state camera lens can be prevented from being damaged by a squeezing action.

Optionally, with reference to the first aspect, in a possible implementation, the driving circuit part comprises a driver chip, the driver chip is fixed on the circuit board, and the driver chip is located at a center of the coil to perform closed-loop control on displacement of the movable member part.

The closed-loop control through the driver chip can precisely control displacement of the movable guide member in the optical axis direction, ensuring accuracy of auto focus and optical image stabilization of the liquid state camera lens.

Optionally, with reference to the first aspect, in a possible implementation, the driving circuit part further comprises a controller, and the controller obtains an auto focus instruction and/or an optical image stabilization instruction, calculates a motor displacement instruction through algorithm, and inputs the motor displacement instruction to the driver chip to perform the closed-loop control on the sub-motor part.

The motor displacement instruction generated through the controller may enable the motor to separately perform auto focus and optical image stabilization on the liquid state camera lens, or may enable the motor to perform auto focus and optical image stabilization on the liquid state camera lens at the same time.

Optionally, with reference to the first aspect, in a possible implementation, a plurality of sub-motors are arranged, and the plurality of sub-motors are distributed around the optical axis to form the motor. The plurality of sub-motors can squeeze different positions of the liquid state camera lens around the optical axis, and implement auto focus and optical image stabilization of the liquid state camera lens at the same time.

According to a second aspect, an embodiment of this application further provides a camera lens assembly. The camera lens assembly includes a liquid state camera lens, a housing, a motor, and a photosensitive chip. The motor is the motor for driving a liquid state camera lens according to the first aspect; the photosensitive chip is arranged opposite to the liquid state camera lens; the motor is arranged between the liquid state camera lens and the photosensitive chip; the liquid state camera lens is connected to the motor by the housing; and a central axis of the motor is collinear with an optical axis of the liquid state camera lens.

The camera lens assembly provided in this aspect includes the liquid state camera lens, the housing, the motor, and the photosensitive chip. In a process of shooting a subject, the camera lens assembly can perform auto focus, and can implement optical image stabilization, ensuring shooting quality.

Optionally, with reference to the second aspect, in a possible implementation, that the liquid state camera lens is connected to the motor by the housing comprises:

an end of the housing is provided with an opening; the opening is connected to the liquid state camera lens; the housing and a motor base in the motor form a cavity to accommodate the motor; and the motor comprises a squeezing component, the squeezing component is in contact with the liquid state camera lens, and the squeezing component squeezes the liquid state camera lens when subjected to a driving force of the motor.

In this implementation, the motor is arranged inside the housing, and the liquid state camera lens is arranged at the opening of the housing, which can ensure that in a process in which the motor squeezes the liquid state camera lens, positions of the motor and the liquid state camera lens do not move, thereby ensuring accuracy of the auto focus and the optical image stabilization.

According to a third aspect, an embodiment of this application further provides a terminal device. The terminal device includes a camera lens assembly, and the camera lens assembly is the camera lens assembly according to the second aspect.

DESCRIPTION OF EMBODIMENTS

The following clearly describes technical solutions in embodiments of this application with reference to the accompanying drawings in the embodiments of this application.

The technical solutions of this application are applied to an intelligent electronic device, and the electronic device includes a camera lens assembly configured to shoot a subject.

The electronic device may be a terminal device. The terminal device may be, for example, a smart phone, a tablet computer, a personal computer (personal computer, PC), a foldable terminal, a wearable device with a wireless communication function (such as a smart watch or band), a user device (user device) or a user equipment (user equipment, UE), an in-vehicle terminal, an augmented reality (augmented reality, AR) or a virtual reality (virtual reality, VR) device, or a headset. A specific device form of the terminal device is not limited in this embodiment.

Figure 1:
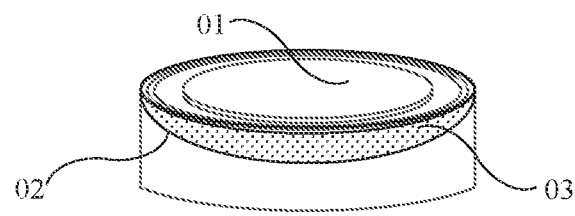
FIG. 1 is a schematic structural diagram of a liquid state camera lens according to this application.
Figure 2:
FIG. 2 is a diagram of an application scenario of a liquid state camera lens according to this application.

FIG. 2 is a diagram of an application scenario of a liquid state camera lens according to this application. FIG. 2 schematically shows a scenario in which the liquid state camera lens is applied to a smartphone. It may be learned from FIG. 2 that the technical solutions of this application may be applied to a rear camera 201 or a front camera 202 of the smartphone.

During use of a camera, it is often necessary to change a focus position of a camera lens assembly to implement auto focus and optical image stabilization of the camera to improve imaging quality, to implement clear imaging.

Related terms of this application are first introduced before the technical solutions of this application are introduced.

1. Auto Focus

Auto focus (auto focus, AF) is to use the principle of subject light reflection of to receive light reflected by a subject through a graphics processing unit behind a camera lens assembly, obtain an object distance of the subject by processing of the processing unit, calculate a focal length of the camera lens assembly according to the object distance, and adjust the camera lens assembly according to the focal length, to move an imaging point of the subject to a focal plane.

2. Optical Image Stabilization

Optical image stabilization (optical image stabilization, OIS) is to use settings to optical components (such as a camera lens) in an imaging instrument to reduce impact on imaging caused by camera jitter, thereby improving imaging quality. For example, when the camera jitters, according to a jitter direction and displacement amount of the camera, the entire camera is translated or rotated along an opposite direction through a motor.

A liquid state camera lens is a micro camera lens in which a lens assembly has a variable curvature, and parameters of the camera lens assembly and the like can be changed by external control to change a light path of imaging, to further implement the auto focus and the optical image stabilization. An optical axis of the liquid state camera lens generally refers to a center line of a camera lens.

Figure 3:
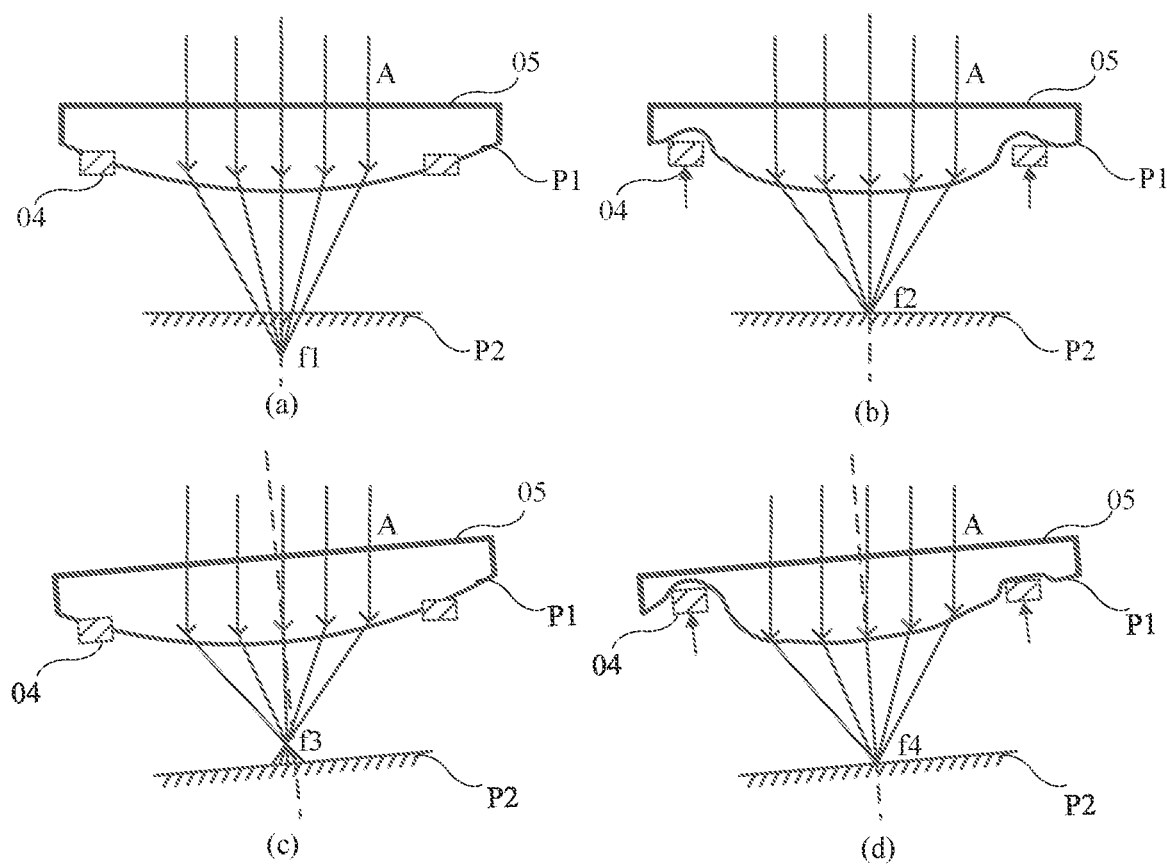
FIG. 3 is a principle diagram of auto focus and optical image stabilization of a liquid state camera lens according to an embodiment of this application.

FIG. 3 is a principle diagram of auto focus and optical image stabilization of a liquid state camera lens according to an embodiment of this application. FIG. 3 shows a working process of the auto focus and the optical image stabilization of a liquid state camera lens 05.

During the auto focus by the liquid state camera lens 05, a plurality of action forces may be applied to the liquid state camera lens 05 through a motor or the like, so that a refraction plane of the lens assembly is uniformly deformed, that is, a light path of light reflected by the subject through the lens assembly is changed, so that an imaging focus moves up and down along the optical axis, thereby keeping the imaging focus at a focal plane to obtain a clear image.

As shown in (a) and (b) of FIG. 3, a plurality of light rays L entering from a light entry side A are refracted by a light refraction plane P1 and form an imaging focus f1 on the optical axis, but beyond a focal plane P2. In this case, the obtained image is not clear, and therefore the auto focus is required. A squeezing assembly 04 of the motor moves toward a direction of A under an action of a driving motor and the like, and a plurality of squeezing assemblies 04 uniformly squeeze the lens assembly, so that a curvature of the light refraction plane P1 increases. In this case, refraction angles of the plurality of light rays L on the light refraction plane P1 increase, and the original focus f1 moves toward the direction of the light entry side A, forming a focus f2 remaining on the focal plane P2. In this case, a clear image can be obtained, to implement the auto focus.

During optical image stabilization by the liquid state camera lens 05, a plurality of action forces may be applied to the liquid state camera lens 05 through the motor or the like, so that the refraction plane of the lens assembly is non-uniformly deformed, that is, the light path of the light reflected by the object is changed, so that a focus deviated from the focal plane P2 moves on the focal plane to obtain a clear image. As shown in (c) and (d) of FIG. 3, if the liquid state camera lens 05 is affected by jitter during exposure, the lens assembly may deviate. The plurality of light rays L entering from the light entry side A are refracted by the light refraction plane P1, and a formed imaging focus f3 deviates from the focal plane P2. In this case, the obtained image is not clear, and therefore the optical image stabilization is required. The squeezing assembly 04 of the motor moves toward the direction of A under the action of the driving motor and the like, and the plurality of squeezing assemblies 04 each move by a certain distance and non-uniformly squeeze the lens assembly, so that the curvature of the light refraction plane P1 is non-uniformly changed. In this case, the refraction angles of the plurality of light rays L are affected in different degrees and changed in different degrees. The original focus f3 deviates to f4, reversely compensating an impact of the jittering liquid state camera lens 05 on the light path during exposure, to implement clear imaging.

When squeezing the liquid state camera lens 05, to prevent the squeezing assembly 04 from deviating during a movement, the conventional motor includes a guide elastic piece. The guide elastic piece can ensure that the squeezing assembly only move in an optical axis direction, instead of moving in a direction perpendicular to the optical axis direction. However, in a process in which the squeezing assembly 04 squeezes the liquid state camera lens 05, the squeezing assembly 04 may deform and produce a force opposite to a moving direction of the squeezing assembly 04. The force may result in an insufficient driving force, affecting accuracy of the auto focus and the optical image stabilization of the liquid state camera lens 05.

Figure 4:
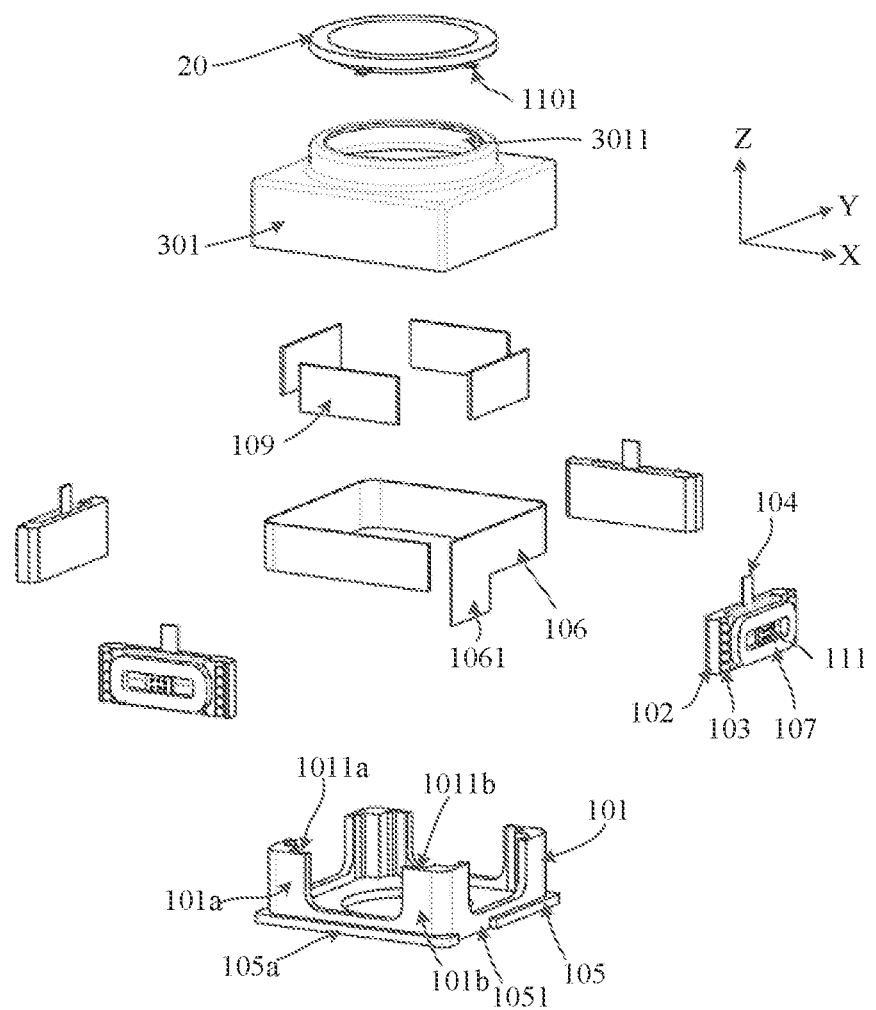
FIG. 4 is an exploded perspective view of a motor according to an embodiment of this application.
Figure 5:
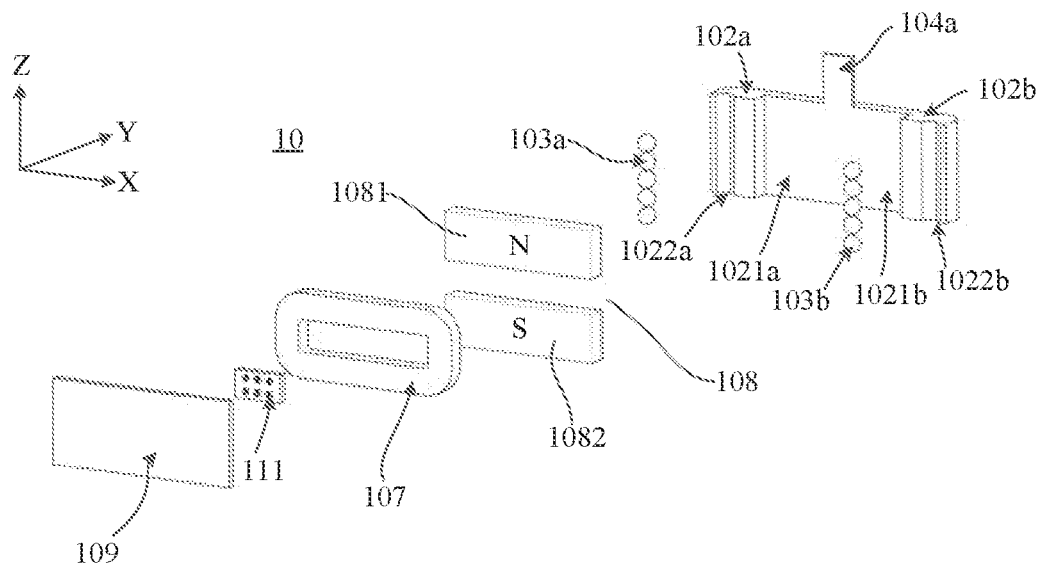
FIG. 5 is a schematic exploded view of some components of a motor according to an embodiment of this application.
Figure 6:
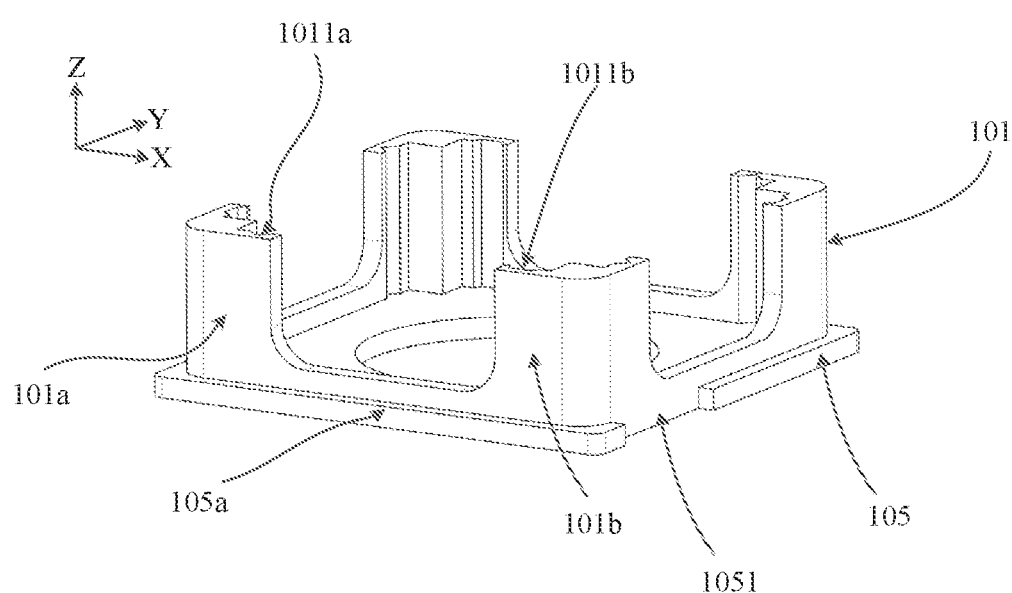
FIG. 6 is a schematic structural diagram of a motor base and a fixed guide member according to an embodiment of this application.
Figure 7:
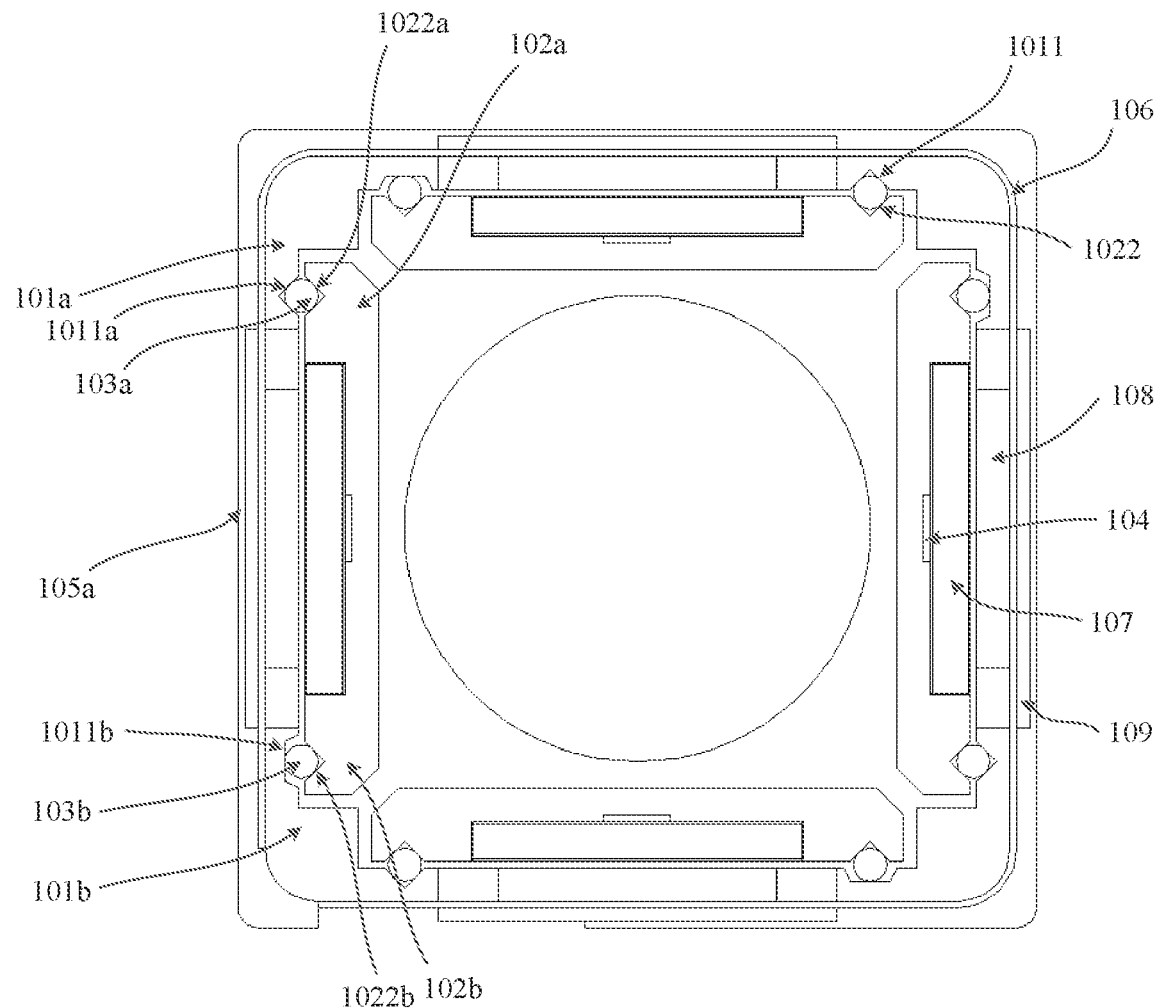
FIG. 7 is a schematic diagram of cooperation between a fixed guide member and a movable guide member according to an embodiment of this application.
Figure 8:
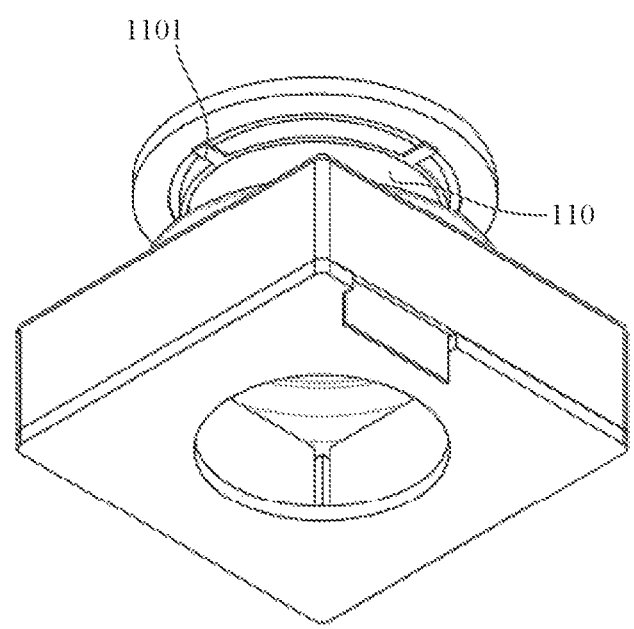
FIG. 8 is a schematic structural diagram of a squeezing component according to an embodiment of this application.

FIG. 4 is an exploded perspective view of a motor according to an embodiment of this application, FIG. 5 is a schematic exploded view of some components of a motor according to an embodiment of this application, FIG. 6 is a schematic structural diagram of a motor base and a fixed guide member according to an embodiment of this application, FIG. 7 is a schematic diagram of cooperation between a fixed guide member and a movable guide member according to an embodiment of this application, and FIG. 8 is a schematic structural diagram of a squeezing component according to an embodiment of this application. For ease of understanding, an optical axis direction of the liquid state camera lens is defined as a Z axis, a direction of a camera lens close to the subject is defined as a front side, that is, a positive direction of the Z axis, and a direction of the camera lens away from the subject is defined as a rear side, that is, a negative direction of the Z axis. A first direction perpendicular to the optical axis direction is an X axis, and it may be seen from the figures that an edge at a lower left corner of the motor is parallel to an X axis direction. A second direction perpendicular to the optical axis direction and the first direction is a Y axis, and it may be seen from the figures that an edge at a lower right corner of the motor is parallel to a Y axis direction. In the X axis direction and the Y axis direction, a side close to the Z axis is defined as an inner side, and a side away from the Z axis is defined as an outer side. Correspondingly, the definitions of the directions of the X axis, the Y axis, and the Z axis, and the front side, the rear side, the outer side, and the inner side are equally applicable in other accompanying drawings.

It should be understood that the foregoing directions of the X axis, the Y axis, and the Z axis, and the front side, the rear side, the outer side, and the inner side are merely for easily describing the motor provided in the embodiments of this application and clearly showing the structure and connection relationships of the structure of the motor, but should not be construed as any limitation on the embodiments of this application.

A motor for driving a liquid state camera lens 20 provided in this embodiment of this application may include one or more sub-motors 10. When the motor includes a plurality of sub-motors 10, the plurality of sub-motors 10 may form an integral motor around an optical axis. The quantity of the sub-motors 10 may be 4, 6, 8, or more. The plurality of sub-motors 10 is independently controllable.

For example, a same control instruction may be inputted to the plurality of sub-motors 10 to control the plurality of sub-motors 10 to perform same movements; or, control instructions may be separately inputted to the plurality of sub-motors 10 to control the plurality of sub-motors 10 to perform independent movements, and moving manners of the plurality of sub-motors 10 do not affect each other; or, a same control instruction may be inputted to several of the sub-motors 10 to control the several of the sub-motors 10 to perform same movements, and control instructions may be separately inputted to the other sub-motors 10 to control the other sub-motors 10 to perform movements separately.

Four sub-motors 10 surrounding the optical axis to form an integral motor is used as an example in this embodiment of this application to introduce the structure of the motor. The integral motor is of a square shape, and the four sub-motors are separately arranged on four edges of the integral motor.

The sub-motor 10 provided in this embodiment of this application includes a fixed guide member 101, a movable guide member 102, guide balls 103, a connecting arm 104, a motor base 105, and a circuit board 106. The fixed guide member 101 is arranged opposite to the movable guide member 102, the guide balls 103 are arranged between the fixed guide member 101 and the movable guide member 102, the fixed guide member 101 is fixed on the motor base 105, and the connecting arm 104 is fixed at a side of the movable guide member 102 facing the liquid state camera lens 20. The movable guide member 102 can move relative to the fixed guide member 101 in the optical axis direction, and the guide balls 103 between the fixed guide member 101 and the movable guide member 102 can reduce a friction force to enable the movable guide member 102 to move more smoothly. During a movement of the movable guide member 102 along the optical axis, the connecting arm 104 can squeeze the liquid state camera lens 20 to cause the liquid state camera lens 20 to perform the auto focus and/or the optical image stabilization.

It may be understood that in the technical solution provided in this embodiment of this application, the liquid state camera lens 20 is at the foremost side, and the motor base 105 is at the rearmost side (lowermost end).

A driving force generated when the movable guide member 102 moves relative to the fixed guide member 101 may be from an electromagnetic interaction force. According to the magnetic effect of the electric current, an energized coil can generate a magnetic field around. When the energized coil has a corresponding magnet, that is, a magnet is arranged in the magnetic field generated by the energized coil, the magnet is moved by an electromagnetic force in the magnetic field.

In an implementation, the sub-motor 10 further includes a motor base 105 on which a fixed guide member 101 is fixed, a circuit board 106 arranged at a periphery of the fixed guide member 101, a coil 107 fixed at a side of the fixed guide member 101 facing the optical axis, and a magnet 108 arranged opposite to the coil 107, and the magnet 108 is fixed on a movable guide member 102.

The coil 107 is electrically connected to the circuit board 106. When the coil 107 is energized, the magnet 108 is in the magnetic field generated by the coil 107, and moves relative to the coil 107 under an action of the electromagnetic force, that is, forward or backward along the optical axis. Because the magnet 108 is fixed on the movable guide member 102, the movement of the magnet 108 drives the movable guide member 102 to move, thereby driving the connecting arm 104 to perform a movement of squeezing the liquid state camera lens 20.

The guide balls 103 are fixed between the fixed guide member 101 and the movable guide member 102. When the movable guide member 102 moves forward or backward, the guide balls 103 roll between the fixed guide member 101 and the movable guide member 102 in the optical axis direction, reducing the friction force of the movement of the movable guide member 102, so that the electromagnetic force between the energized coil 107 and the magnet 108 can be converted into the driving force as much as possible for driving the movable guide member 102 to move to reduce a loss of the driving force, ensuring accuracy of movement displacement of the movable guide member 102, thereby ensuring the accuracy of the auto focus and/or the optical image stabilization.

The connecting arm 104 and the movable guide member 102 may be an integrally formed structure, or may be connected in a fixing manner. In a process in which the connecting arm 104 squeezes the liquid state camera lens 20, to accurately transfer displacement of the movable guide member 102 generated under an action of the driving force to a surface of the liquid state camera lens 20, and to prevent the connecting arm 104 from losing stability, the connecting arm 104 is a rigid connecting arm. In the optical axis direction, a deformation amount of the integral structure formed by the connecting arm 104 and the movable guide member 102 is much smaller than a displacement amount. The connecting arm 104 may be made of steel, stainless steel, aluminum, hard plastic, or the like.

The sub-motor 10 further includes a magnetic conductive sheet 109, and the magnetic conductive sheet 109 is fixed at a side of the fixed guide member 101 away from the magnet 108. The magnetic conductive sheet 109, the coil 107, and the magnet 108 may form a closed magnetic circuit.

In some implementations, the magnetic conductive sheet 109 may be made of iron or another metal.

If the magnetic circuit is not closed, an air gap exists in the magnetic circuit, and magnetic leakage is produced, increasing energy consumption. The formed closed magnetic circuit can reduce the magnetic leakage when the magnet 108 and the coil 107 are energized, ensuring an action force between the coil 107 and the magnet 108, that is, ensuring a thrust force of the motor.

In the conventional motor, it is likely that a gap between a fixed member and a movable member changes. If a constant gap between the fixed member and the movable member cannot be ensured, a driving force of the motor changes consequently, and accuracy of displacement of the movable member in the optical axis direction cannot be ensured, which affects results of the auto focus and/or the optical image stabilization. In this embodiment of this application, an attraction force between the magnet 108 and the magnetic conductive sheet 109 can ensure a constant gap between the magnet 108 and the coil 107, ensuring that the driving force is correctly applied to the movable guide member 102, avoiding affecting sensing precision of calibration of a location sensing device (Hall).

In addition, because the magnet 108 is fixed on the movable guide member 102, and the magnetic conductive sheet 109 is fixed at a side of the fixed guide member 101 away from the coil 107, the attraction force between the magnet 108 and the magnetic conductive sheet 109 can be applied to the fixed guide member 101, the guide balls 103, and the movable guide member 102 to ensure that the movable guide member always presses the guide balls on the fixed guide member tightly, thereby ensuring that the guide balls can stably move between the fixed guide member and the movable guide member to guide and reduce the friction force.

The movable guide member 102, the guide balls 103, the connecting arm 104, and the magnet 108 may be considered as a movable member part movable relative to the liquid state camera lens 20, and the fixed guide member 101, the motor base 105, the circuit board 106, the coil 107, and the magnetic conductive sheet 109 may be considered as a fixed member part fixed relative to the liquid state camera lens 20.

In another implementation, the sub-motor 10 further includes a motor base 105 on which a fixed guide member 101 is fixed, a magnet 108 fixed at a side of the fixed guide member 101 facing the optical axis, and a coil 107 arranged opposite to the magnet 108, and the coil 107 is fixed on the movable guide member 102. A circuit board 106 is arranged at a periphery of the coil 107, and the coil 107 is connected to the circuit board 106. The magnet 108 may be fixed on the motor base 105 to form a fixed member part, and the coil 107 may be fixed on the movable guide member 102 to form a movable member part with the circuit board 106.

In some implementations, the circuit board 106 and the coil 107 are connected by a flexible printed circuit board (flexible printed circuit board, FPC), and the circuit board 106 is connected to an external circuit by a flexible circuit board, that is, the circuit board 106 transmits an electrical signal through the flexible circuit board.

When energized, the coil 107 generates a magnetic field, and under an action of an electromagnetic action force, the coil 107 moves relative to the fixed magnet 108, that is, forward or backward. Because the coil 107 is fixed on the movable guide member 102, a movement of the coil 107 drives the movable guide member 102 to move, thereby driving the connecting arm 104 to perform a movement of squeezing the liquid state camera lens 20. In addition, because the circuit board 106 is arranged at a periphery of the coil 107, the circuit board 106 moves with the coil 107.

The sub-motor 10 further includes a magnetic conductive sheet 109, and the magnetic conductive sheet 109 is fixed at a side of the coil 107 away from the magnet 108. The magnetic conductive sheet 109, the magnet 108, and the coil 107 may form a closed magnetic circuit. The formed closed magnetic circuit can reduce magnetic leakage and ensure a thrust force of the motor. In addition, an attraction force exists between the magnet 108 and the magnetic conductive sheet 109. Because the coil 107 is fixed on the movable guide member 102, and the magnetic conductive sheet 109 is fixed at a side of the coil 107 away from the magnet 108, the attraction force between the magnet 108 and the magnetic conductive sheet 109 may be applied to the fixed guide member 101, the guide balls 103, and the movable guide member 102, so that the guide ball 103 can stably maintain between the fixed guide member 101 and the movable guide member 102 to guide and reduce the friction force.

The movable guide member 122, the guide ball 103, the connecting arm 104, the circuit board 106, the coil 107, and the magnetic conductive sheet 109 may be considered as a movable member part movable relative to the liquid state camera lens 20, and the fixed guide member 101, the motor base 105, and the magnet 108 may be considered as a fixed member part fixed relative to the liquid state camera lens 20.

It may be learned from FIG. 5, the magnet 108 of the sub-motor 10 includes an N pole 1081 and an S pole 1082 fixed in the optical axis direction. The N pole 1081 and the S pole 1082 are arranged opposite to each other front to rear, which is not limited to a situation in which the N pole 1081 is arranged at a front side of the S pole 1082 in this embodiment and may be arranged according to a direction of the magnetic field.

Optionally, in some implementations, the coil 107 may be annular, or may be in another shape, such as rectangular or triangular. According to the shape of the motor base 105 or the movable guide member 102, the coil 107 may be matched in an appropriate shape.

In addition, the quantity of the coils 107 in the sub-motor 10 is not limited to one, or may be more than one, and a plurality of coils 107 may be energized at the same time.

The sub-motor 10 includes at least two fixed guide members 101. Referring to FIG. 4, two fixed guide members 101 being fixed on a motor base 105a is used as an example for description. A fixed guide member 101a and a fixed guide member 101b are fixed at two ends of the motor base 105a, an outer side of the fixed guide member 101a is provided with a first guide rail groove 1011a, and an outer side of the fixed guide member 101b is provided with a first guide rail groove 1011b.

In some implementations, the fixed guide members 101 of two adjacent sub-motors 10 may form an integral structure.

Referring to FIG. 5, the sub-motor 10 includes at least two movable guide members 102 to match two fixed guide members 101.

Referring to FIG. 6, a movable guide member 102a and a movable guide member 102b are respectively opposite to the fixed guide member 101a and the fixed guide member 101b, and the movable guide member 102a and the movable guide member 102b may be integrally formed.

Still referring to FIG. 5, the movable guide member 102a includes a guide rail substrate 1021a, and an inner side of the guide rail substrate 1021a is provided with a second guide rail groove 1022a. The movable guide member 102b includes a guide rail substrate 1021b, and an inner side of the guide rail substrate 1021b is provided with a second guide rail groove 1022b. The first guide rail groove 1011a and the second guide rail groove 1022a may match each other, and the first guide rail groove 1011b and the second guide rail groove 1022b may match each other. The guide balls 103a may move in a space formed by the first guide rail groove 1011a and the second guide rail groove 1022a, and the guide balls 103b may move in a space formed by the first guide rail groove 1011b and the second guide rail groove 1022b.

In the space formed by the opposite arranged guide rail grooves, the quantity of accommodated guide balls 103 may be designed according to requirements, which may be four, five, or more, and only five guide balls shown in the figure are used as an example. The five guide balls 103 are arranged front to rear in the optical axis direction.

The first guide rail groove 1011a and the first guide rail groove 1011b may be V-shaped grooves or rectangular grooves, and the second guide rail groove 1022a and the second guide rail groove 1022b may be V-shaped grooves or rectangular grooves.

In an implementation, at least one first guide rail groove 1011 is a rectangular groove, or at least one second guide rail groove 1022 is a rectangular groove.

For example, the first guide rail groove 1011b is a rectangular groove, and the first guide rail groove 1011a, the second guide rail groove 1022a, and the second guide rail groove 1022b are V-shaped grooves. The V-shaped first guide rail groove 1011a matches the V-shaped second guide rail groove 1022a, and the rectangular first guide rail groove 1011b matches the V-shaped second guide rail groove 1022b. When the movable guide member 102 moves relative to the fixed guide member 101 forward or backward in the optical axis direction, the two opposite arranged V-shaped grooves and the guide balls 103 therebetween play a role of guiding, and the opposite arranged rectangular groove and V-shaped groove and the guide balls 103 therebetween play a role of supporting and guiding.

It may be seen from FIG. 7 that when the guide balls 103 are arranged between the rectangular first guide rail groove 1011b and the V-shaped second guide rail groove 1022b, the guide balls 103 are only in contact with a bottom surface of the first guide rail groove 1011b. Such a matching manner can ensure that the guide balls 103 are not jammed during guiding.

In some implementations, the rectangular guide rail groove may be arranged on the movable guide member 102, or may be arranged on the fixed guide member 101.

Still referring to FIG. 4, for ease of wiring of a driving circuit, the sub-motor 10 may further include a circuit board 106. The circuit board 106 may be a carrier electrically connected to other electrical devices of the sub-motor 10.

The circuit board 106 includes a connection portion 1061, and wiring in the circuit board 106 may be connected to an external driving circuit and the like by the connection portion 1061. The motor base 105 is provided with a groove 1051, and the connection portion 1061 extends outward by the groove 1051.

In some implementations, the circuit board 106 may be a printed circuit board (printed circuit board, PCB), a flexible printed circuit board (flexible printed circuit board, FPC), or the like.

A specific shape of the circuit board 106 may be adaptively designed according to an actual situation.

In some implementations, the wiring of the circuit board 106 may be integral IC wiring, or may be common wiring.

In some implementations, circuit boards 106 of the plurality of sub-motors 10 may form an integral structure by welding, or may be separate and independent.

To precisely control a moving manner of the movable guide member 12, the sub-motor 10 may include a driver chip 111. The driver chip 111 may be arranged at a center of the coil 107 and fixed on a side surface of the circuit board 106. A fixing manner may be welding, and a solder pad or the like may be arranged on the driver chip 111.

The driver chip 111 can perform closed-loop control on displacement of the movable guide member 102, so that more precise auto focus and optical image stabilization can be implemented.

It should be understood that when the coil 107 moves as a movable member part, the driver chip 111 arranged at the center of the coil moves together with the coil 107.

The sub-motor 10 may further include a controller. The controller may obtain an auto focus instruction and/or an optical image stabilization instruction, calculates a motor displacement instruction by superimposing and blending algorithms, and inputs the motor displacement instruction to the driver chip 11 to perform the closed-loop control on the sub-motor 10. The controller can control the motor to perform the auto focus and the optical image stabilization at the same time, or can control the motor to separately perform the auto focus and the optical image stabilization.

In some implementations, the plurality of sub-motors 10 may be controlled by one controller, or may be controlled by a plurality of controllers together.

Still referring to FIG. 5, an end of a connecting arm 104a is fixed at a front side of the guide rail substrate 1021a and the guide rail substrate 1021b. When the movable guide member 12 moves in the optical axis direction forward or backward, the connecting arm 104a moves with the movable guide member 12.

Referring to FIG. 8, the sub-motor 10 may further include a squeezing component. The squeezing component may include an arc-shaped squeezing portion 110 and a lug 1101 arranged on an outer arc of the squeezing portion 110. The squeezing component may be in direct contact with the liquid state camera lens 20 to squeeze the liquid state camera lens 20.

A front end of the connecting arm 104 may be provided with an insertion hole, and the lug 1101 of the squeezing component may be inserted into the insertion hole of a connecting portion 104. When the connecting arm 104 moves forward or backward in the optical axis direction, the squeezing portion 110 is driven to squeeze the liquid state camera lens 20 in the optical axis direction. A connecting manner between the connecting arm 104 and the lug 1101 is not limited to being connected through the insertion hole, or may be connected in hinged point contact.

In some implementations, arc-shaped squeezing portions 110 of the plurality of sub-motors 10 may be separate and independent, or may form an integral annular squeezing portion. Alternatively, the arc-shaped squeezing portion 110 may be of another shape, such as L-shaped.

Figure 9:
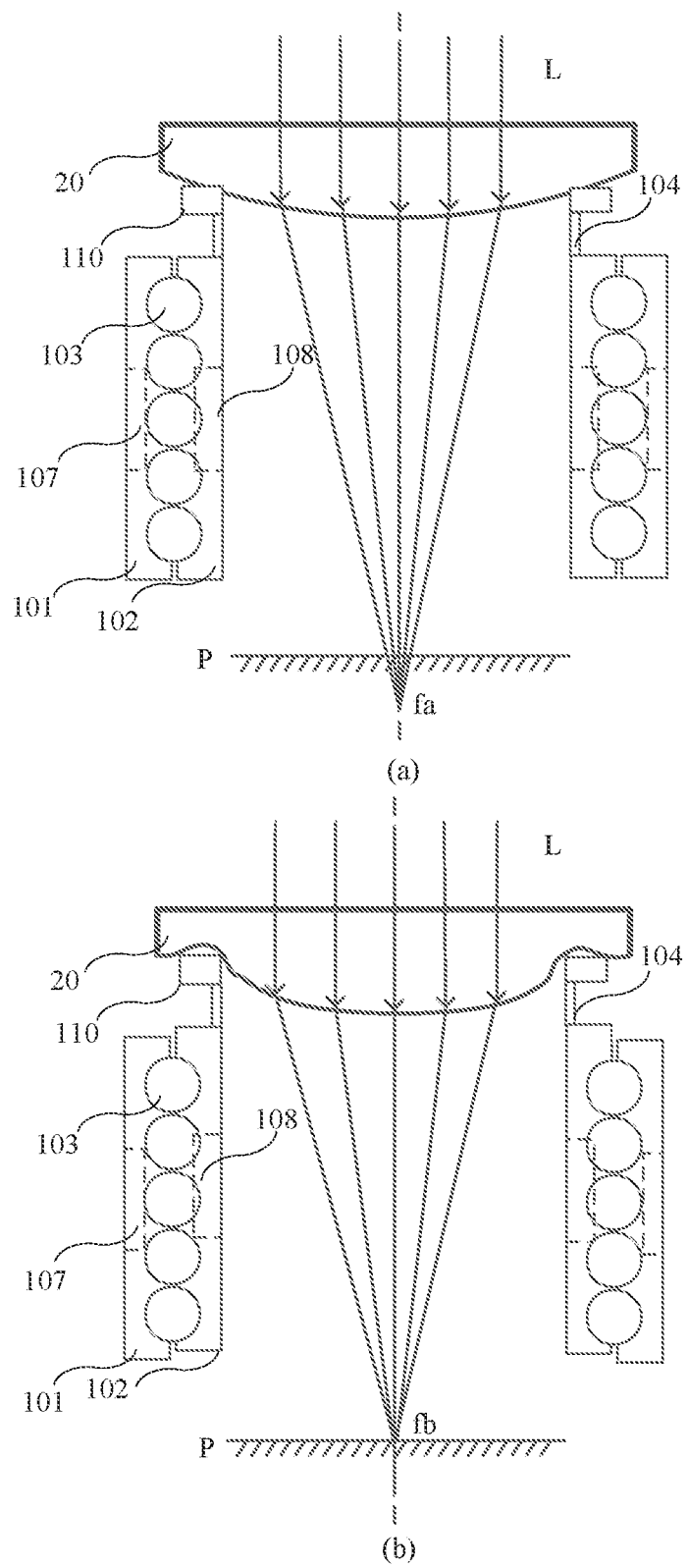
FIG. 9 is a schematic principle diagram of a motor performing auto focus according to an embodiment of this application.

A process of auto focus of the motor is described in detail below with reference to FIG. 9. FIG. 9 is a schematic principle diagram of a motor performing auto focus according to an embodiment of this application. FIG. 9 only shows a case that the fixed member part includes the coil 107 and the movable member part includes the magnet 108, and embodiments in which the fixed member part includes the magnet 108 and the movable member part includes the coil 107 has the same working principle of auto focus.

It should be noted that, for ease of understanding, FIG. 9 only schematically shows the fixed guide member 101, the movable guide member 102, the guide ball 103, the connecting arm 104, the coil 107, the magnet 108, and the squeezing portion 110, without showing the motor base 105, the circuit board 106, the driver chip 111, and the like.

FIG. 9(a) shows a case before the auto focus is performed. A light ray L reflected by a subject, after entering the liquid state camera lens 20, is focused to a focus fa through refraction, and the focus fa deviates from a focal plane P. In this case, the controller obtains an auto focus instruction and forms closed-loop control with the driver chip 111 to energize the coil 107. FIG. 9(b) shows a process of the auto focus. After energized, the magnet 108 is subjected to an electromagnetic force in a magnetic field of the coil 107, and moves relative to the fixed coil 107 in the optical axis direction. The movement of the magnet 108 drives the connecting arm 104 to move in the optical axis direction, so that the squeezing portion 110 can squeeze the liquid state camera lens 20 in the optical axis direction. Squeezing of the squeezing portion 110 changes a curvature of the liquid state camera lens 20, so that the light ray L is refracted to a focus fb after passing through the liquid state camera lens 20, and the focus fb is at the focal plane P, thereby completing the auto focus.

In the process of auto focus, the focus moves in the optical axis direction. Therefore, the change of the curvature of the liquid state camera lens 20 needs to be uniform, and squeezing portions 110 of the plurality of sub-motors 10 need to apply uniform forces to the liquid camera lens, that is, an integral squeezing portion needs to apply uniform forces to the liquid state camera lens 20. In other words, thrust forces of connecting arms 104 of the plurality of sub-motors 10 in the optical axis direction are the same, that is, magnets 108 of the plurality of sub-motors 10 are subjected to the same electromagnetic forces. In this case, the plurality of sub-motors 10 may be controlled by one controller together, or may be controlled by a plurality of controllers respectively.

Figure 10:
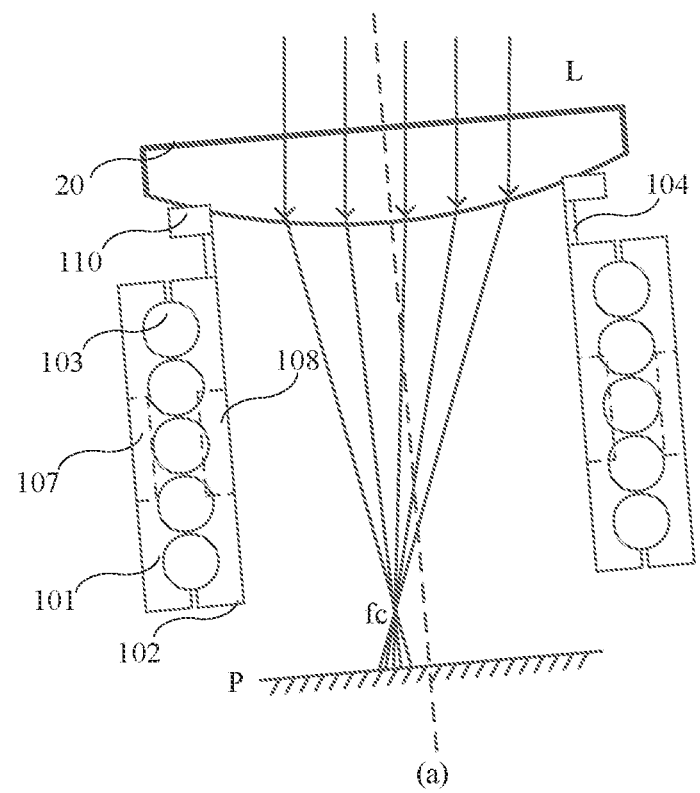
FIG. 10 is a schematic principle diagram of a motor performing optical image stabilization according to an embodiment of this application.
Figure 10:
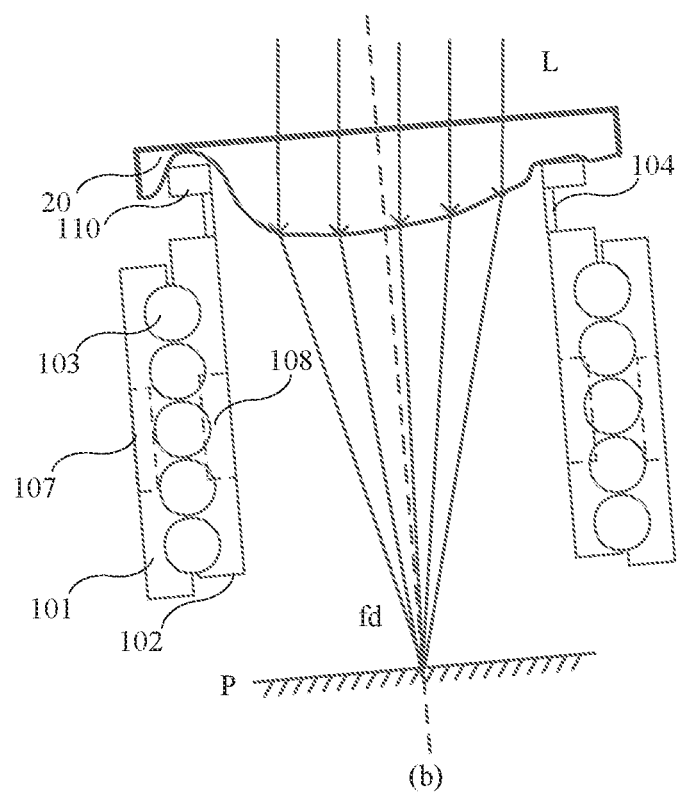

A process of optical image stabilization of the motor is described in detail below with reference to FIG. 10. FIG. 10 is a schematic principle diagram of a motor performing optical image stabilization according to an embodiment of this application. FIG. 10 only shows a case that the fixed member part includes the coil 107 and the movable member part includes the magnet 108, and embodiments in which the fixed member part includes the magnet 108 and the movable member part includes the coil 107 has the same working principle of optical image stabilization.

It should be noted that, for ease of understanding, FIG. 10 only schematically shows the fixed guide member 101, the movable guide member 102, the guide ball 103, the connecting arm 104, the coil 107, the magnet 108, and the squeezing portion 110, without showing the motor base 105, the circuit board 106, the driver chip 111, and the like.

FIG. 10(a) shows a case before the optical image stabilization is performed. A light ray L reflected by a subject, after entering the liquid state camera lens 20, is focused to a focus fc through refraction. Affected by jitter of the liquid state camera lens 20, the focus fc deviates from the focal plane P, and the formed image is not clear. In this case, the controller obtains an optical image stabilization instruction and forms closed-loop control with the driver chip 111 to energize the coil 107. FIG. 10(b) shows a process of the optical image stabilization. After energized, the magnet 108 is subjected to an electromagnetic force in a magnetic field of the coil 107, and moves relative to the fixed coil 107 in the optical axis direction. The movement of the magnet 108 drives the connecting arm 104 to move in the optical axis direction, so that the squeezing portion 110 can squeeze the liquid state camera lens 20 in the optical axis direction. Squeezing of the squeezing portion 110 changes a curvature of the liquid state camera lens 20, so that the light ray L is refracted to a focus fd after passing through the liquid state camera lens 20, and the focus fd is at the focal plane P, thereby completing the optical image stabilization.

In the process of the optical image stabilization, the problem that a focus deviates from a focal plane needs to be resolved, and the focus deviates from the optical axis. Therefore, the change of the curvature of the liquid state camera lens 20 needs to be non-uniform, and squeezing portions 110 of the plurality of sub-motors 10 need to apply different or partially same forces to the liquid state camera lens 20. In other words, thrust forces of connecting arms 104 of the plurality of sub-motors 10 in the optical axis direction are different or partially same, that is, magnets 108 of the plurality of sub-motors 10 are subjected to different or partially same electromagnetic forces.

The motor in this embodiment can separately perform the auto focus and the optical image stabilization, or may perform the auto focus and the optical image stabilization at the same time.

In some implementations, the process of the auto focus can be implemented by using one sub-motor 10. The connecting arm 104 of the sub-motor 10 is connected to an annular integral squeezing portion. In the process of the auto focus, the liquid state camera lens 20 needs to be squeezed uniformly. Therefore, the movable guide member 102 of the sub-motor 10 moves in the optical axis direction and drives the connecting arm 104 and the annular integral squeezing portion, and the integral squeezing portion can apply a uniform force to the liquid state camera lens 20. In this process, a perpendicular state may be maintained between the connecting arm 104 and the integral squeezing portion, that is, the annular integral squeezing portion and the optical axis are in a perpendicular state, preventing the annular integral squeezing portion from deviation and avoiding inaccurate auto focus caused by non-uniform squeezing to the liquid state camera lens 20.

In some implementations, the process of the optical image stabilization may be implemented by using three sub-motors 10, or the process of the optical image stabilization may be implemented by using four sub-motors 10. The connecting arm 104 is connected to the annular integral squeezing portion. Specifically, the connecting arm 104 is in hinged electrical contact with the lug 1101, and a contact position of the lug 1101 moves as the connecting arm 104 moves up and down. In this case, for the integral annular squeezing portion, when there is only one connecting arm 104 moving, the integral squeezing portion and the optical axis are in a non-perpendicular state. In this way, non-uniform squeezing to the liquid state camera lens 20 can be implemented.

Figure 11:
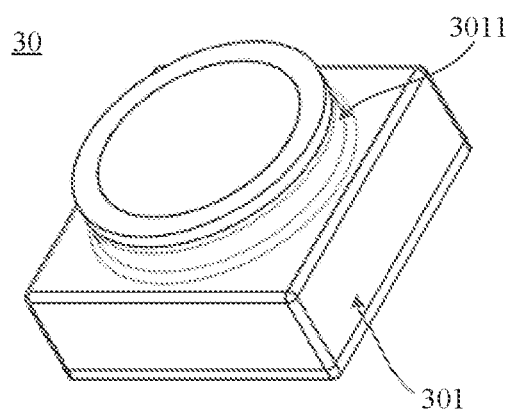
FIG. 11 is a schematic structural diagram of a camera lens assembly according to an embodiment of this application.

Referring to FIG. 11, an embodiment of this application further provides a camera lens assembly 30, which includes a liquid state camera lens 20, a housing 301, a photosensitive chip, and the motor according to the foregoing embodiments. The motor included in the camera lens assembly 30 shown in the figure is formed by four sub-motors 10. The photosensitive chip and the liquid state camera lens 20 are arranged opposite to each other, and the motor is arranged between the liquid state camera lens and the photosensitive chip. The camera lens assembly 30 is integrally a cuboid. The liquid state camera lens 20 is connected to the motor by the housing 301, and a central axis of the motor is collinear with an optical axis of the liquid state camera lens 20.

An end of the housing 301 is provided with an opening 3011, and the liquid state camera lens 20 is arranged in the opening 3011. The opening 3011 can fix the liquid state camera lens 20.

A cavity is formed between the housing 301 and an integral motor base of the motor. The cavity can accommodate components of the motor.

The camera lens assembly 30 in this embodiment of this application can complete the auto focus and the optical image stabilization. Specifically, the motor arranged in the housing 301 applies a force to the liquid state camera lens 20 arranged in the opening 3011 to squeeze the liquid state camera lens 20, so as to implement the auto focus and the optical image stabilization of the camera lens assembly 30.

An embodiment of this application further provides a terminal device, which includes the camera lens assembly according to the foregoing embodiment.

Apparently, the described embodiments are a part rather than all of the embodiments of this application. Other embodiments obtained by a person skilled in the art based on the embodiments of this application without creative efforts shall fall within the protection scope of this application.

It should be understood that this application is not limited to the precise structures described above and shown in the accompanying drawings, and various modifications and changes can be made without departing from the scope of this application. The scope of this application is subjected only to the appended claims.

What is claimed is:

1. A motor for driving a liquid state camera lens, wherein the motor comprises at least one sub-motor, the sub-motor is independently controllable, and the sub-motor comprises:
    a fixed member part;
    a movable member part movable relative to the fixed member part in an optical axis direction of the liquid state camera lens, wherein
    the fixed member part comprises a fixed guide member, the movable member part comprises a movable guide member, a connecting arm, and a plurality of guide balls, the fixed guide member and the movable guide member are arranged opposite to each other, and the plurality of guide balls are arranged between the fixed guide member and the movable guide member; the connecting arm is arranged at an end of the movable guide member facing the liquid state camera lens; and the movable guide member drives the connecting arm to squeeze the liquid state camera lens when subjected to a force in the optical axis direction; and
    a driving circuit part, configured to control displacement of the movable member part in the optical axis direction.

2. The motor for driving a liquid state camera lens according to claim 1, wherein the fixed member part further comprises a motor base on which the fixed guide member is fixed, a circuit board arranged at a periphery of the fixed guide member, and a coil fixed at a side of the fixed guide member facing an optical axis; and
    the movable member part further comprises a magnet arranged opposite to the coil, and the magnet is fixed on the movable guide member.

3. The motor for driving a liquid state camera lens according to claim 2, wherein the fixed member part further comprises a magnetic conductive sheet, the magnetic conductive sheet is fixed at a side of the fixed guide member away from the coil, and the magnetic conductive sheet, the coil, and the magnet form a closed magnetic circuit.

4. The motor for driving a liquid state camera lens according to claim 1, wherein the fixed member part further comprises a motor base on which the fixed guide member is fixed, and a magnet fixed at a side of the fixed guide member facing an optical axis; and the movable member part further comprises a coil arranged opposite to the magnet and fixed on the movable guide member, and a circuit board arranged at a periphery of the coil.

5. The motor for driving a liquid state camera lens according to claim 4, wherein the movable member part further comprises a magnetic conductive sheet, the magnetic conductive sheet is fixed at a side of the coil away from the magnet, and the magnetic conductive sheet, the coil, and the magnet form a closed magnetic circuit.

6. The motor for driving a liquid state camera lens according to claim 2, wherein a plurality of sub-motors are arranged, and motor bases of the plurality of sub-motors form an integral motor base.

7. The motor for driving a liquid state camera lens according to claim 1, wherein the fixed member part comprises at least two fixed guide members, the movable member part comprises at least two movable guide members, the fixed guide member is provided with a first guide rail groove, the movable guide member is provided with a second guide rail groove, the first guide rail groove and the second guide rail groove are arranged opposite to each other, and the guide balls are arranged between the first guide rail groove and the second guide rail groove.

8. The motor for driving a liquid state camera lens according to claim 7, wherein the first guide rail groove is a V-shaped groove or a rectangular groove; and the second guide rail groove is a V-shaped groove or a rectangular groove.

9. The motor for driving a liquid state camera lens according to claim 8, wherein at least one first guide rail groove is a rectangular groove; or at least one second guide rail groove is a rectangular groove.

10. The motor for driving a liquid state camera lens according to claim 1, wherein the connecting arm is rigid.

11. The motor for driving a liquid state camera lens according to claim 1, wherein the sub-motor further comprises a squeezing component, the squeezing component comprises an arc-shaped squeezing portion, and a lug arranged on an outer arc of the squeezing portion, and the lug is connected to an end of the connecting arm away from the movable guide member; and the squeezing component directly faces the liquid state camera lens and is in contact with the liquid state camera lens.

12. The motor for driving a liquid state camera lens according to claim 2, wherein the driving circuit part comprises a driver chip, the driver chip is fixed on the circuit board, and the driver chip is located at a center of the coil to perform closed-loop control on displacement of the movable member part.

13. The motor for driving a liquid state camera lens according to claim 12, wherein the driving circuit part further comprises a controller, and the controller obtains an auto focus instruction and/or an optical image stabilization instruction, calculates a motor displacement instruction through algorithm, and inputs the motor displacement instruction to the driver chip to perform the closed-loop control on the sub-motor part.

14. The motor for driving a liquid state camera lens according to claim 1, wherein a plurality of sub-motors are arranged, and the plurality of sub-motors are distributed around the optical axis to form the motor.

15. A camera lens assembly, comprising a liquid state camera lens, a housing, a motor, and a photosensitive chip, wherein
the motor is the motor for driving a liquid state camera lens according to claim 1;
the photosensitive chip is arranged opposite to the liquid state camera lens;
the motor is arranged between the liquid state camera lens and the photosensitive chip;
the liquid state camera lens is connected to the motor by the housing; and
a central axis of the motor is collinear with an optical axis of the liquid state camera lens.

16. The camera lens assembly according to claim 15, wherein that the liquid state camera lens is connected to the motor by the housing comprises:
an end of the housing is provided with an opening;
the opening is connected to the liquid state camera lens;
the housing and a motor base in the motor form a cavity to accommodate the motor; and
the motor comprises a squeezing component, the squeezing component is in contact with the liquid state camera lens, and the squeezing component squeezes the liquid state camera lens when subjected to a driving force of the motor.

17. A terminal device, comprising a camera lens assembly, wherein the camera lens assembly is the camera lens assembly according to claim 15.

* * * * *